US006576150B1

(12) United States Patent
Weigert

(10) Patent No.: US 6,576,150 B1
(45) Date of Patent: Jun. 10, 2003

(54) PROCESS FOR THE PRODUCTION OF A GLASS ARTICLE HAVING AT LEAST ONE RECESS

(75) Inventor: Martin Weigert, Hardt (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/407,264

(22) Filed: Sep. 27, 1999

Related U.S. Application Data

(63) Continuation of application No. PCT/DE98/00849, filed on Mar. 23, 1998.

(51) Int. Cl.$^7$ .............................................. C03C 15/00
(52) U.S. Cl. ............................ 216/24; 216/26; 216/52; 216/88; 216/97
(58) Field of Search ............................ 216/24, 26, 51, 216/97, 52

(56) References Cited

U.S. PATENT DOCUMENTS

| 3,784,424 A | 1/1974 | Chang | 438/559 |
|---|---|---|---|
| 4,269,654 A | * 5/1981 | Deckert et al. | 252/79.3 |
| 4,334,349 A | * 6/1982 | Aoyama et al. | 257/758 |
| 4,931,077 A | 6/1990 | Angenent et al. | 65/31 |
| 5,091,045 A | 2/1992 | Froning et al. | 156/633 |
| 5,174,857 A | 12/1992 | Sung | 156/643 |
| 6,254,796 B1 | * 7/2001 | Rath et al. | 216/87 |

FOREIGN PATENT DOCUMENTS

| DE | 254 811 A1 | 3/1988 |
|---|---|---|
| DE | 43 21 582 A1 | 1/1995 |

OTHER PUBLICATIONS

S. Kal et al, Slope etching of silicon dioxide, XP–002072514 and Microelectronics and Reliability, 1990, UK, vol. 30, No. 4, pp. 719–722.
G.A.C.M. Soierings, Review Wet chemical etching of silicate glasses in hydrofuoric acid based solutions, Journal of materials Science letters, 12 (1993), Dec. 1, No. 23, London, GB.

* cited by examiner

Primary Examiner—Anita Alanko
(74) Attorney, Agent, or Firm—Laurence A. Greenberg; Werner H. Stemer; Gregory L. Mayback

(57) ABSTRACT

An etching mask with at least one etching window is applied on a glass object consisting substantially of boron silicate glass. Subsequently, the glass object is etched through the etching window by using, for instance, HF, thereby producing trapezoidal trenches or truncated pyramidal grooves in its cross-section.

18 Claims, 5 Drawing Sheets

PROCESS FOR THE PRODUCTION OF A GLASS ARTICLE HAVING AT LEAST ONE RECESS

CROSS-REFERENCE TO RELATED APPLICATION

This application is a continuation of copending International Application PCT/DE98/00849, filed Mar. 23, 1998, which designated the United States.

BACKGROUND OF THE INVENTION

Field of the Invention

The invention relates, in general, to a process for producing a glass article that can be used to transmit or reflect light, and, in particular, to a process for producing a glass article having at least one planar side wall that is oblique with respect to a main surface of the glass article.

More specifically, the invention relates to a process for producing a glass article having at least one trench which is substantially trapezoidal in cross section, or having at least one slot, or having at least one substantially frustopyramidal pit/through-hole. It further relates to a process for producing an optoelectronic module having a glass article produced in this way.

Until now, trenches that are trapezoidal in cross section have been produced in glass articles by sawing. The degree of roughness and level of surface damage is greatly dependent upon the saw blade used. Frustopyramidal pits or through-holes cannot be produced by a sawing process and significant outlay is required to produce them by boring and grinding.

German published, non-prosecuted Patent Application DE 43 21 582 A1 discloses a process for making a reflecting oblique face on the surface of an article. The article contains an interface that defines a plane and extends as far as the surface of the article. Two materials with different etching rates that can be etched isotropically using a particular etchant meet at the interface. The surface of the article is etched for a particular length of time with the particular etchant while allowing this etchant to act simultaneously on the materials with the different etching rates. Articles fabricated in this way are, in particular, employed in two-way transmission and reception modules, hybrids, multiplex components and other optical circuits in optical telecommunications.

G.A.M.C. SPIERINGS: "Review of wet chemical etching of silicate glasses in hydrofluoric acid based solutions", Journal of Materials Science, vol. 12, No. 23, December 1993, pages 6261–6273 discloses the use of aqueous HF solutions for isotropically etching silicate glasses. When a mask film is sufficiently adhered to the glass, a semicircular boundary of the etched edge results. The etched edge can be formed with a tapering wall structure by appropriately controlling the photoresist mask material and the fixed etching rate. A similar effect can be obtained when an additional film is used between the glass to be etched and the mask material. The additional film must have a higher etching rate than that of the glass. The ratio between the etching rates of the additional film and the glass determines the inclination of the etched edge.

The INSPEC database, Institute of Electrical Engineers, Stevenage, GB, INSPEC No. 3737969 discloses a wet chemical process for the formation of inclined window edges during the selective etching of SiO/sub 2 films. The dependency of the etching profile on the etchant temperature and on the photoresist thickness has been investigated. The angle of inclination decreases significantly with temperature, but does not depend on the photoresist thickness.

SUMMARY OF THE INVENTION

It is accordingly an object of the invention to provide a technologically simpler process for producing a glass article having at least one planar side wall that is oblique with respect to a main surface of the glass article. The object of the process is to produce a glass article with trenches which are substantially trapezoidal in cross section, or slots, or substantially frustopyramidal pits or through-holes in a straightforward way.

With the foregoing and other objects in view there is provided, in accordance with the invention, a process for producing a glass article having at least one recess defining at least one planar side wall that is oblique with respect to a main surface of the glass article. The process includes providing a glass article having a main surface and made of a borosilicate glass; providing an etching mask on the main surface of the glass article, the etching mask having at least one etching window; anisotropically wet chemically etching the glass article through the etching window with an etching mixture to obtain a recess with at least one planar side wall forming an angle with the main surface of the article; and determining a magnitude of the angle by varying a parameter selected from the group consisting of an etching temperature, an etching time, and a composition of the etching mixture.

The invention provides a process in which a glass article, which consists essentially of borosilicate glass, is produced. An etching mask, which is provided with at least one etching window, is then applied to a main surface of the glass article. By anisotropic etching through the etching window, a recess is then formed in the glass article with at least one locally planar side wall which is oblique with respect to the main surface, with the etching mask being undercut-etched. "Locally planar" means that at least one subregion of the side wall is a planar surface.

An etching mixture that essentially contains hydrofluoric acid, nitric acid and/or ammonium fluoride is preferably used for etching. Etching depths in excess of 100 µm can thereby advantageously be produced. By varying the etching parameters and the composition of the etching mixture, the angle formed between the main surface and the planar region of the side boundary, for example a side wall of a trapezoidal trench or slot or a frustopyramidal pit, can be adjusted.

The following etching conditions are, for example, preferably selected:

Etching mixture: 10–50% strength hydrofluoric acid

Etching temperature: 10–60° C.

Etching time: 1–180 minutes (for large etching depths in excess of 100 µm, even longer)

The etching mask is preferably produced by applying a metal layer to the main surface of the glass article and subsequently structuring the metal layer using photographic techniques. These are process steps known from semiconductor technology for the production of etching masks and will not therefore be explained in further detail at this point.

In accordance with an added feature of the invention, the process includes providing the glass article with an additional main surface that is opposite from the main surface of the glass article; providing a support that is substantially unaffected by the etching mixture; fastening the additional main surface of the glass article to the support; performing the step of providing the etching mask so that the etching mask has a plurality of etching windows; and performing the step of anisotropically wet chemically etching so that the glass article is etched through the plurality of etching windows.

In accordance with an additional feature of the invention, the process includes performing the step of anisotropically wet chemically etching so that the glass article is etched through the plurality of etching windows all the way to the support.

In accordance with a further feature of the invention, the process includes providing the glass article with an additional main surface that is opposite from the main surface; performing the step of providing the etching mask so that the etching mask has a plurality of etching windows; performing the step of anisotropically wet chemically etching so that the glass article is etched through the plurality of etching windows to form a plurality of recesses selected from the group consisting of substantially frustopyramidally shaped pits and trenches with a substantially trapezoidal crosssection; applying the main surface of the glass article to a support; and grinding the additional main surface of the glass article to form a glass product selected from the group consisting of a plurality of glass prisms that are separated from one another and a glass article with a plurality of through-holes having a substantially frustopyramidal shape.

In accordance with a further added feature of the invention, the process includes performing the step of grinding the additional main surface of the glass article to obtain the plurality of glass prisms; using the at least one planar side wall of the glass article as side surface of one of the plurality of glass prisms; and using the side surface to deflect radiation.

In accordance with a further additional feature of the invention, the process includes performing the step of grinding the additional main surface of the glass article to obtain the glass article; and configuring a radiation emitter or receiver in one of the plurality of through-holes.

In accordance with another feature of the invention, the process includes performing the step of grinding the additional main surface of the glass article to obtain the plurality of glass prisms; fastening a plurality of radiation emitting and/or radiation receiving devices to a subcarrier sheet in accordance with a predetermined pattern; fixing the plurality of glass prisms with respect to one another; fastening the plurality of glass prisms that are fixed with respect to one another to the subcarrier sheet so that each one of the plurality of radiation emitting and/or radiation receiving devices is disposed between two of the plurality of glass prisms; and dividing the subcarrier sheet and the plurality of glass prisms into a plurality of individual optoelectronic modules so that each one of the plurality of optoelectronic modules has a portion of the subcarrier sheet, two of the plurality of glass prisms, and one of the plurality of radiation emitting and/or radiation receiving devices.

In accordance with a yet a further feature of the invention, the process includes performing the step of fixing the plurality of glass prisms with respect to one another by fixing the plurality of glass prisms to a support.

In accordance with a yet a further added feature of the invention, the process includes removing the support before performing the step of dividing the subcarrier sheet.

In accordance with a yet a further additional feature of the invention, the process includes performing the step of fixing the plurality of glass prisms with respect to one another by using glass bridges.

In accordance with a concomitant feature of the invention, the process includes providing the glass article with an additional main surface that is opposite from the main surface; performing the step of providing the etching mask so that the etching mask has a plurality of etching windows; performing the step of anisotropically wet chemically etching so that the glass article is etched through the plurality of etching windows to form a plurality of recesses selected from the group consisting of substantially frustopyramidally shaped pits and trenches with a substantially trapezoidal cross-section; fastening a plurality of radiation emitting and/or radiation receiving devices in the plurality of recesses; and dividing the glass article into a plurality of individual optoelectronic modules so that each one of the plurality of optoelectronic modules has one of the plurality of recesses and one of the plurality of radiation emitting and/or radiation receiving devices.

Other features which are considered as characteristic for the invention are set forth in the appended claims.

Although the invention is illustrated and described herein as embodied in a process for the production of a glass article having at least one recess, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
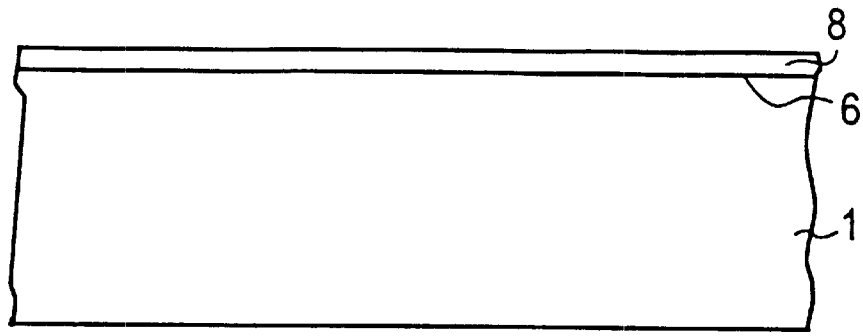
FIGS. 1a to 1d show a schematic representation of the steps of a process for producing a substantially trapezoidal recess in a glass article.

Referring now to the figures of the drawings in detail and first, particularly, to FIGS. 1a to 1d thereof, there is seen a schematically represented process in which a metal layer 8 is applied to a main surface 6 of a glass article 1. The glass article 1 is essentially made of borosilicate glass (FIG. 1a). The metal layer 8, which for example consists of CrPtAuTi, is then structured using a photographic technique and is provided with an etching window 5. Such photographic structuring processes are well known in the art of semiconductor technology and will therefore not be explained in further detail at this point.

Figure 1B:
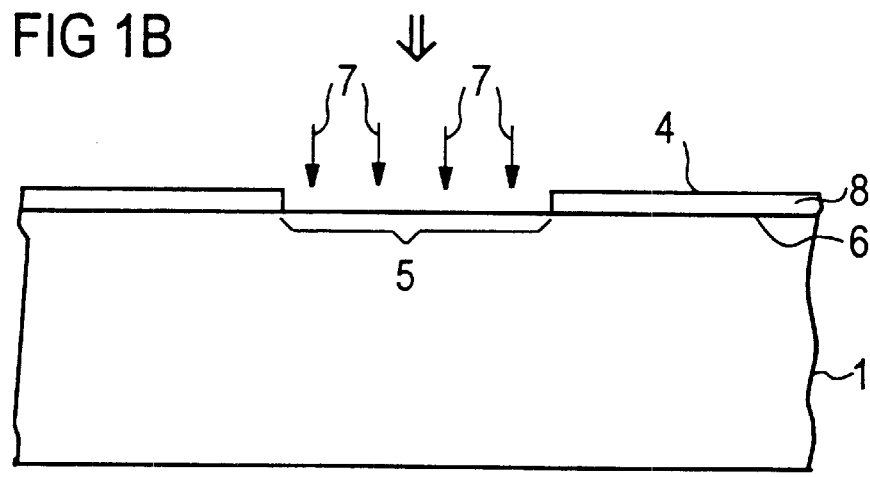

The glass article 1 is then etched anisotropically through the etching window 5, for example, using an etching solution which contains hydrofluoric acid (HF), nitric acid (HNO3) and/or ammonium fluoride (NH4F) (with 40% strength HF at approximately room temperature for about 1 to 180 minutes; for large etching depths in excess of 100 μm, optionally even longer). This creates a recess 2 in the glass article 1, which is substantially trapezoidal in cross section and whose side walls 3 have plane or planar surface regions 9. The planar surfaces 9 form an angle α which is between 90° and 180° with respect to the main surface 6 of the glass article 1. The anisotropic etching step is indicated in FIG. 1b by the arrows 7.

Figure 1C:
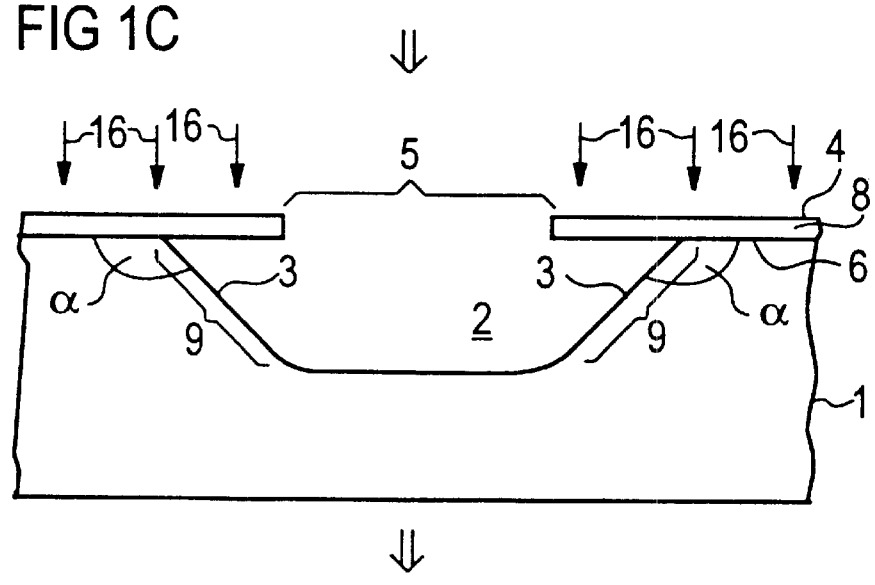

If the etching mask 4 formed by the structured metal layer 8 is no longer needed in subsequent fabrication steps it may be removed, for example, by wet chemically etching and/or by dry etching techniques such as ion beam etching, sputtering, etc. (FIG. 1c). A mechanical process such as sand blasting, grinding, or polishing may likewise be used to remove the etching mask 4. The removal of the etching mask 4 is indicated by the arrows 16 in FIG. 1c. The metal layer 8 can remain if it can be used in the production of corresponding additional devices, for example, the metal layer 8 could serve as a solder base.

Figure 1D:
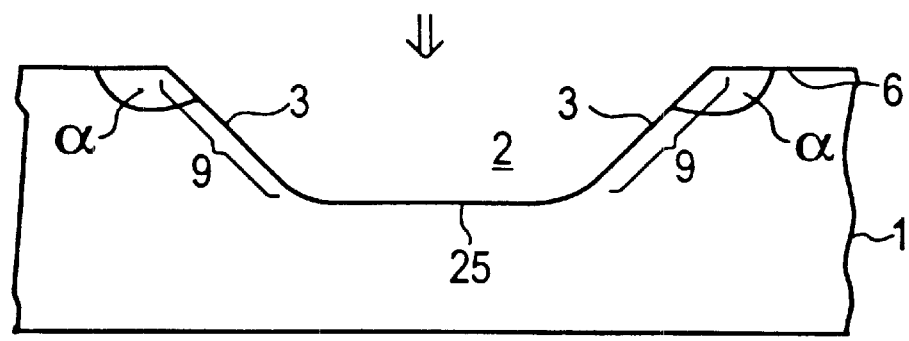

After the completion of the process steps mentioned above, a glass article 1 is obtained with a recess 2 which has a substantially planar bottom surface 25 and substantially planar side walls 3 which are oblique with respect to the main surface 6 (FIG. 1d). The recess 2 is in the form of a trench that is substantially trapezoidal in cross section or is in the form of a frustopyramidal pit, depending on whether the shape of the etching window 5 is elongate or roughly square.

After performing a process similar to the basic process described above and as will be explained in more detail below, a plurality of recesses 2 with planar oblique side walls 3 are formed in a glass sheet 1 (See FIGS. 2a to 3d). The recesses 2, for example, are in the form of trenches 17 which are substantially trapezoidal in cross section, slots 12, substantially frustopyramidal pits 18, or through-holes 13.

Figure 2A:
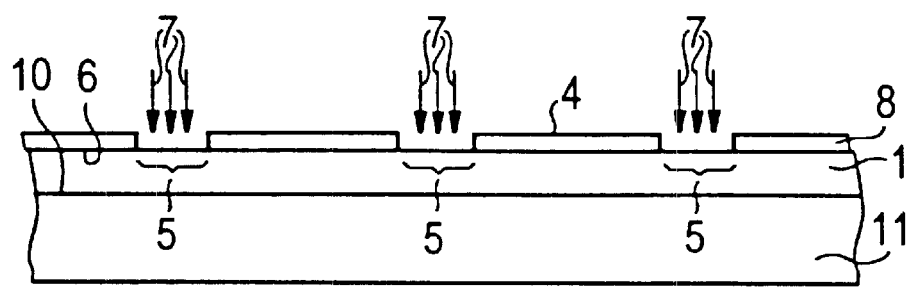
FIGS. 2a and 2b show a schematic representation of a first process sequence for producing a plurality of glass prisms that are substantially trapezoidal in cross section or for producing a glass sheet having a plurality of substantially frustopyramidal through-holes or pits.
Figure 2B:
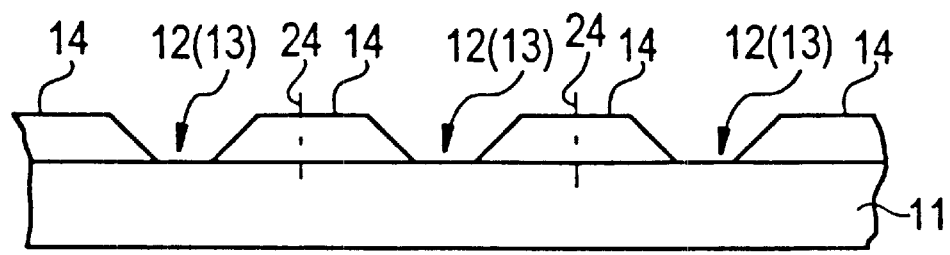
Figure 2C:
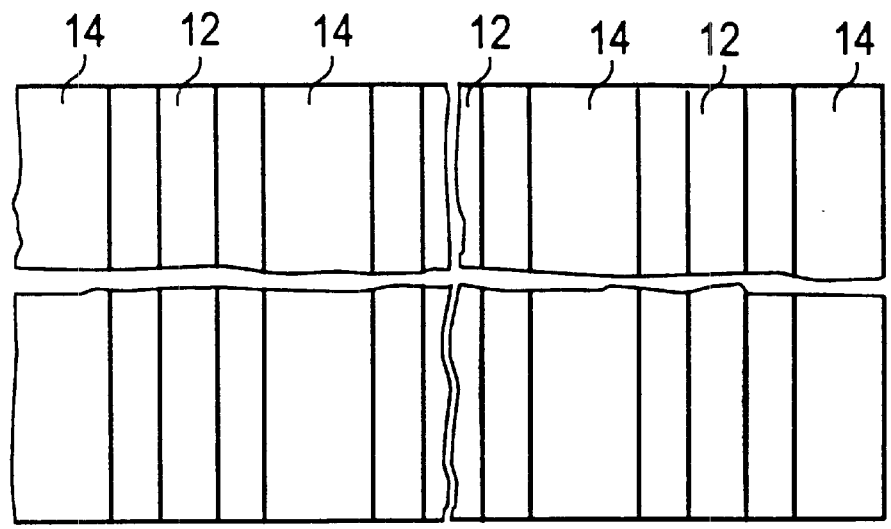
FIG. 2c shows a schematic representation of a plan view of a support having a plurality of glass prisms produced using the process illustrated in FIGS. 2a and 2b.
Figure 2D:
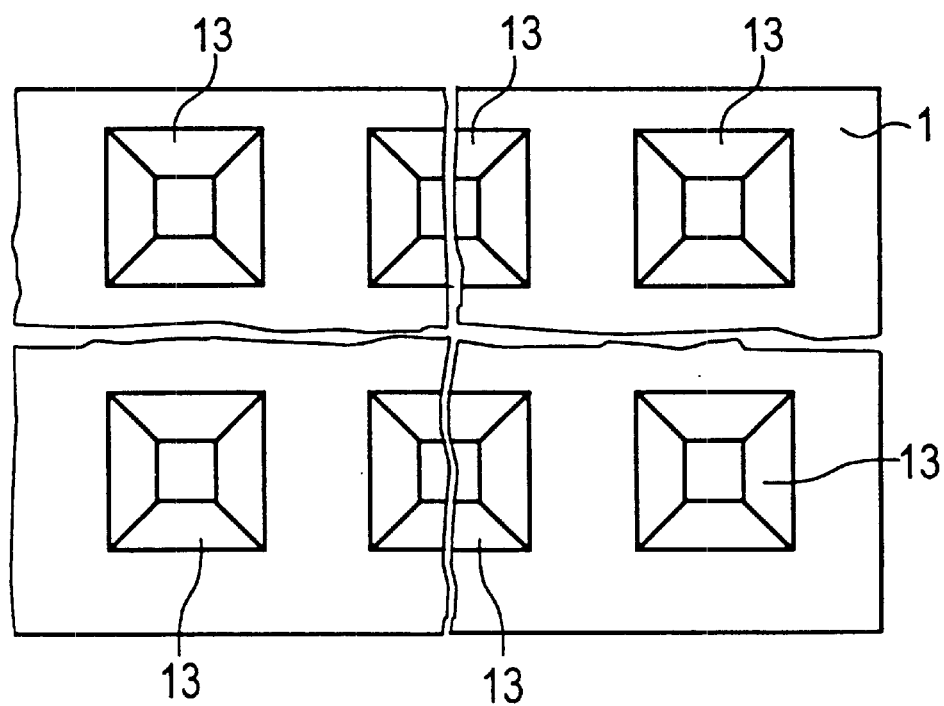
FIG. 2d shows a schematic representation of a plan view of a support having a glass sheet which has a plurality of substantially frustopyramidal through-holes and which is produced using the process illustrated in FIGS. 2a and 2b.

In order to produce a plurality of substantially trapezoidal glass prisms 14, or in order to produce a glass article 1 having a plurality of substantially frustopyramidal through holes 13 or pits 18, the glass article 1 as shown in FIG. 2a is fastened via an opposite main surface 10 to a support 11. The opposite main surface 10 is formed on the glass article 1 opposite from the main surface 6. The support 11 which, for example, consists of silicon or a metallic material is fastened to the opposite main surface 10. Before or immediately after the glass article 1 is fastened to the support 11, the main surface 6 of the glass article 1 is provided with an etching mask 4 that has a plurality of etching windows 5. The shape of the etching windows 5 is dependent upon shape of the desired recesses 12, 13, 17, 18. In order to produce glass prisms 14, the etching mask 4 is provided with a plurality of etching windows 5, for example, in the form of clefts or slots at a distance from one another. In order to produce through-holes 13 or pits 18, the etching mask 4 is provided with a plurality of etching windows 5, for example, in the form of rectangular, square, or otherwise shaped openings. The glass article 1 is then etched through fully by wet chemically etching 7 substantially in the region of the etching window 5, so that, depending on the design of the etching mask 4, elongate slots 12 which are substantially trapezoidal in cross section (FIGS. 2b and 2c) or substantially frustopyramidal through-holes 13 (FIG. 2d) are produced in the glass article 1. The support 11 consists of a material which is not affected by the etching mixture for etching the glass article 1, and therefore acts as an etch stop layer.

In this way, a plurality of glass prisms 14 which are trapezoidal in cross section or a glass sheet 1 having a plurality of frustopyramidal through-holes 13 can be produced. The glass prisms 14, or the glass sheet 1 may be detached from the support 11 following the etching, and optionally other process steps, for example, coating with antireflective or mirrored layers can be performed. Likewise, the prisms 14 may also be processed further in the sheet composite together with the support 11.

If elongate trenches or frustopyramidal pits need to be formed in the glass sheet 1 instead of slots or through-holes, the glass sheet is not etched through fully in the etching step.

Figure 3A:
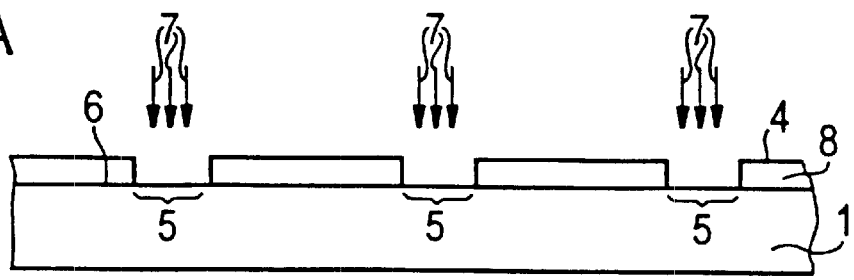
FIGS. 3a to 3d show a schematic representation of a second process sequence for producing a plurality of glass prisms that are substantially trapezoidal in cross section or for producing a glass sheet having a plurality of substantially frustopyramidal through-holes.
Figure 3B:
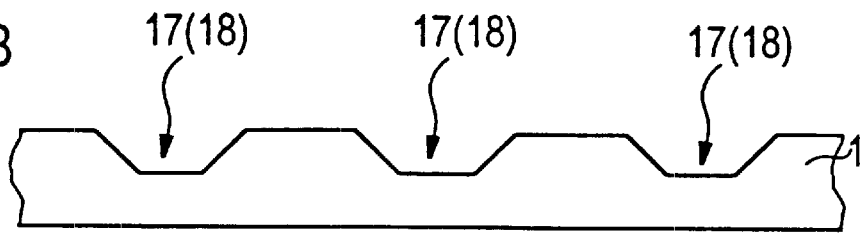

Referring now to FIGS. 3a to 3d, there is seen a schematic representation of a second embodiment of the process and this second embodiment can be used for producing a plurality of trapezoidal glass prisms 14 or for producing a glass article having a plurality of substantially frustoconical through-holes 13. The glass article 1 is first provided with an etching mask 4 having a plurality of etching windows 5 and is etched anisotropically through this etching window 5. The glass article 1 is not etched through fully (FIGS. 3a and 3b). In order, for example, to reduce the risk of fracture, the glass article 1 may in this case be fastened on a support.

Figure 3C:
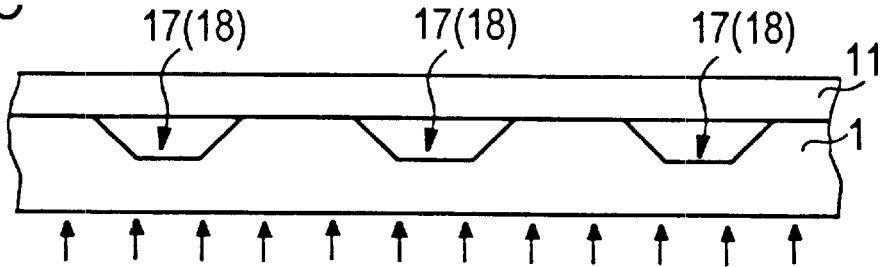
Figure 3D:
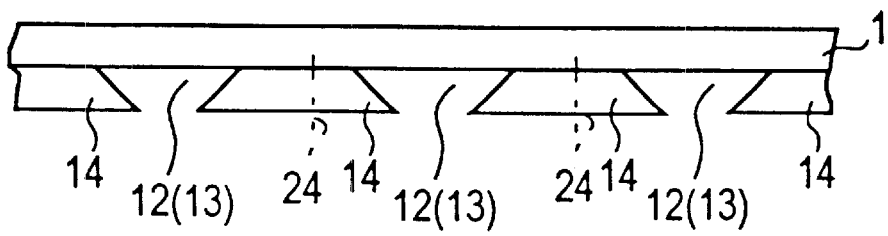

The etching mask 4 is then removed from the glass article 1. The glass article 1 is then applied to a support 11 which, for example, again consists of silicon, via the side provided with trapezoidal trenches 17 or substantially frustopyramidal pits 18, that is to say via its main face 6 (FIG. 3c). The glass article 1 is then ground or polished starting from the side opposite from the main surface 6 (indicated by the arrows 26), until there are individual trapezoidal glass prisms 14 on the support 11, or until there is a glass article 1 having a plurality of frustopyramidal through-holes 13 (FIG. 3d).

Figure 4:
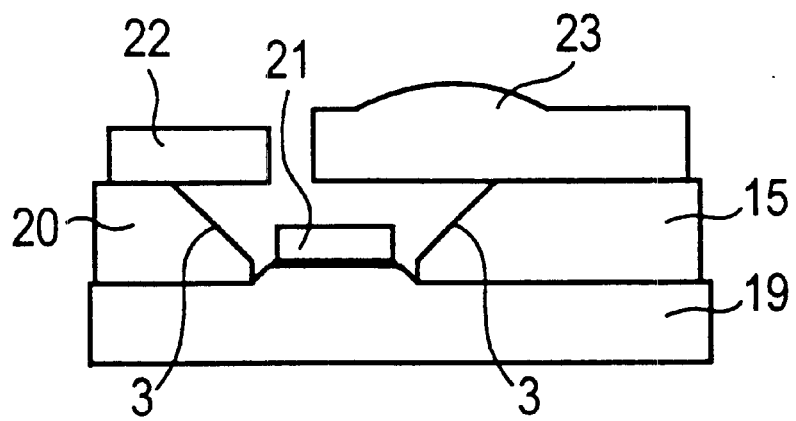
FIG. 4 shows a schematic representation of an optoelectronic module having glass prisms produced using the process according to the invention.

Glass prisms 14 produced in this way can then, for example, be used for the production of an optoelectronic module according to FIG. 4. In the optoelectronic module according to FIG. 4, a first glass prism 15 and at a distance therefrom, a second glass prism 20 are fastened to a sub-carrier 19 in such a way that the oblique side walls 3 face each other. The glass prisms 15, 20 are, for example, produced by sawing through the glass prisms 14 along the partition line 24 indicated in FIG. 3d and by subsequently removing them from the support 11.

A laser chip 21, for example, is arranged between the two glass prisms 15, 20. The emitted laser radiation from the chip 21 is deviated through 90° by an oblique side wall 3 of the first glass prism 15 and is directed through a converging lens 23 which is configured on the glass prism 15. The emitted laser radiation can then be directed, for example, into an optical waveguide. A monitor diode 22 can be fastened on the second glass prism 20 to receive laser radiation that has come from the back of the laser chip 21 and that has been reflected by an oblique side wall 3 of the second glass prism 20. In order to improve the reflective properties of these side walls 3, they are provided with a reflection-enhancing layer, for example, a dielectric mirror layer. Such mirror layers are known and will therefore not be explained in further detail at this point.

A plurality of optoelectronic modules shown in FIG. 4 can be produced by the process according to the invention in a straightforward way in a sheet composition, that is to say by using wafer processes. A plurality of laser chips 21 are fastened on a subcarrier sheet in accordance with a predetermined pattern. Using one of the embodiments of the process described above, a plurality of slots 12 which are substantially trapezoidal in cross section are produced in a glass sheet 1 in accordance with the predetermined pattern. This sheet is then placed on a subcarrier sheet, and connected thereto, in such a way that the laser diode chips 21 lie in the respectively allocated slots. The converging lenses 23 and the monitor diodes 22 are then placed on the glass sheet 1, before the sheet composite made up of the subcarrier sheet and the glass sheet 1 is then divided into individual laser modules. The division can be performed by sawing, for example. The individual laser modules have a subcarrier 19, laser diode chip 21, first and second glass prisms 15, 20, converging lens 23 and monitor diode 22.

Figure 5:
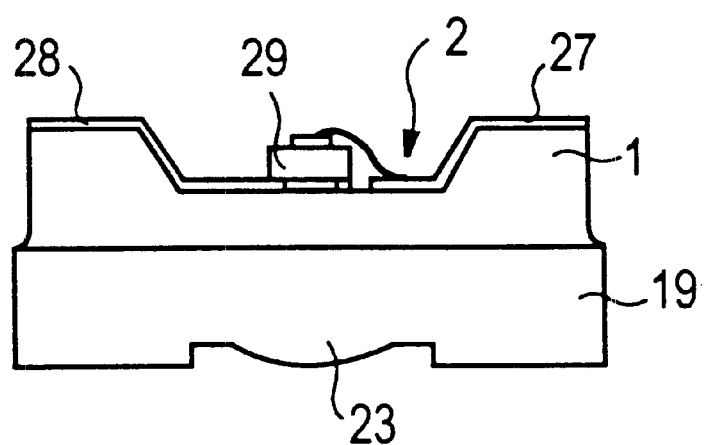
FIG. 5 shows a schematic representation of an optoelectronic module having a glass article that has a recess produced using the process according to the invention.

In the case of the optoelectronic module represented in FIG. 5, a glass article 1 having a recess 2, which is produced using the process according to the invention and is substantially trapezoidal in cross section, is fastened to a subcarrier 19 which, for example, may consist of glass or, assuming a suitable radiation wavelength, of silicon or of another semiconductor material. The recess 2 is on the other side of the glass article 1 from the subcarrier 19, and is provided with electrical interconnections 27, 28, for example metallized tracks, which are routed from the recess 2 onto the main surface 6 of the glass article 1. A radiation-emitting and/or radiation-receiving semiconductor chip 29, for example a light-emitting diode chip or a laser diode chip, is fastened in the recess and is electrically conductively connected to the interconnections 27, 28. The semiconductor chip 29 is fastened on the glass article in such a way that its radiation exit and/or entry face faces the subcarrier 19 and the emitted and/or received radiation passes through the subcarrier 19. The subcarrier 19 has a converging lens 23 on the other side from the glass article 1 in order to focus the emitted and/or received radiation. This converging lens may be formed in the subcarrier 19, for example by means of etching, or be produced separately and fitted on the subcarrier 19.

This optoelectronic module as well can be produced in large batch runs by means of wafer processes by first producing a plurality of trenches which are substantially trapezoidal in cross section in a glass sheet according to a predetermined array. These trenches are then, either before or after connection to a subcarrier sheet, provided with a plurality of interconnections 27, 28 and a corresponding number of semiconductor chips 29. On the subcarrier sheet's main surface on the other side from the glass sheet, converging lenses are produced in accordance with the position of the semiconductor chip, before or after connection to the glass sheet. After this wafer composite made up of the glass sheet and the subcarrier sheet has been fabricated, it is divided into individual optoelectronic modules according to FIG. 5, for example by sawing.

I claim:

1. A process for producing a glass article having at least one recess defining at least one planar side wall that is oblique with respect to a main surface of the glass article, which comprises:

providing a glass article consisting essentially of borosilicate glass having a main surface;

providing an etching mask with at least one etching window on the main surface of the glass article;

anisotropically wet chemically etching the glass article through the etching window with an etching mixture to obtain a recess with at least one planar side wall forming an angle with the main surface of the article; and determining a magnitude of the angle by varying a parameter selected from the group consisting of an etching temperature, an etching time, and a composition of the etching mixture.

2. The process according to claim 1, wherein the etching mixture contains at least one component selected from the group consisting of hydrofluoric acid, nitric acid, and ammonium fluoride.

3. The process according to claim 1, wherein the step of providing the etching mask comprises forming the etching mask directly on the main surface of the glass article.

4. The process according to claim 1, wherein the recess is a recess selected from the group consisting of a frustopyramidal pit, a frustopyramidal through-hole, and a trench with a substantially trapezoidal cross-section.

5. The process according to claim 4, which comprises:

providing the glass article with an additional main surface opposite from the main surface of the glass article;

providing a support that is substantially unaffected by the etching mixture;

fastening the additional main surface of the glass article to the support;

forming the etching mask with a plurality of etching windows; and performing the step of anisotropically wet chemically etching so that the glass article is etched through the plurality of etching windows.

6. The process according to claim 5, which comprises performing the step of anisotropically wet chemically etching so that the glass article is etched through the plurality of etching windows down to the support.

7. The process according to claim 1, which comprises:

providing the glass article with an additional main surface opposite from the main surface;

forming the etching mask with a plurality of etching windows;

performing the step of anisotropically wet chemically etching so that the glass article is etched through the plurality of etching windows to form a plurality of recesses selected from the group consisting of substantially frustopyramidally shaped pits and trenches with a substantially trapezoidal cross-section;

applying the main surface of the glass article to a support; and grinding the additional main surface of the glass article to form a glass product selected from the group consisting of a plurality of glass prisms that are separated from one another and a glass article with a plurality of through-holes having a substantially frustopyramidal shape.

8. The process according to claim 7, which comprises incorporating the glass product in an integrated optical device.

9. The process according to claim 7, which comprises incorporating the glass product as a beam deflector.

10. The process according to claim 7, which comprises:

performing the step of grinding the additional main surface of the glass article to obtain the plurality of glass prisms;

using the at least one planar side wall of the glass article as a side surface of one of the plurality of glass prisms; and using the side surface to deflect radiation.

11. The process according to claim 7, which comprises:

performing the step of grinding the additional main surface of the glass article to obtain the glass article; and configuring a radiation emitter or receiver in one of the plurality of through-holes.

12. The process according to claim 7, which comprises:

performing the step of grinding the additional main surface of the glass article to obtain the plurality of glass prisms;

fastening a plurality of radiation emitting and/or radiation receiving devices to a subcarrier sheet in accordance with a predetermined pattern;

fixing the plurality of glass prisms with respect to one another;

fastening the plurality of glass prisms that are fixed with respect to one another to the subcarrier sheet so that each one of the plurality of radiation emitting and/or radiation receiving devices is disposed between two of the plurality of glass prisms; and dividing the subcarrier sheet and the plurality of glass prisms into a plurality of individual optoelectronic modules so that each one of the plurality of optoelectronic modules has a portion of the subcarrier sheet, two of the plurality of glass prisms, and one of the plurality of radiation emitting and/or radiation receiving devices.

13. The process according to claim 12, which comprises performing the step of fixing the plurality of glass prisms with respect to one another by fixing the plurality of glass prisms to a support.

14. The process according to claim 13, which comprises removing the support before performing the step of dividing the subcarrier sheet.

15. The process according to claim 12, which comprises performing the step of fixing the plurality of glass prisms with respect to one another by using glass bridges.

16. The process according to claim 1, which comprises:

providing the glass article with an additional main surface opposite from the main surface;

forming the etching mask with a plurality of etching windows;

performing the step of anisotropically wet chemically etching so that the glass article is etched through the plurality of etching windows to form a plurality of recesses selected from the group consisting of substantially frustopyramidally shaped pits and trenches with a substantially trapezoidal cross-section;

fastening a plurality of radiation emitting and/or radiation receiving devices in the plurality of recesses; and dividing the glass article into a plurality of individual optoelectronic modules so that each one of the plurality of optoelectronic modules has one of the plurality of recesses and one of the plurality of radiation emitting and/or radiation receiving devices.

17. The process according to claim 1, which comprises:

using the at least one planar side wall of the glass article as side surface of a glass prism; and using the side surface to deflect radiation.

18. The process according to claim 1, which comprises configuring a radiation emitter or receiver in the recess.

* * * * *

UNITED STATES PATENT AND TRADEMARK OFFICE
CERTIFICATE OF CORRECTION

PATENT NO.      : 6,576,150 B1
DATED           : June 10, 2003
INVENTOR(S)     : Martin Weigert It is certified that error appears in the above-identified patent and that said Letters Patent is hereby corrected as shown below:

<u>Title page,</u>
Insert Item -- [30] Foreign Application Priority Data
              Mar. 26, 1997     (DE)   ……….. 197 12 779 --

Signed and Sealed this

Sixteenth Day of September, 2003

JAMES E. ROGAN
*Director of the United States Patent and Trademark Office*